US012326222B1

(12) United States Patent
Meng et al.

(10) Patent No.: US 12,326,222 B1
(45) Date of Patent: Jun. 10, 2025

(54) SEALING STRUCTURE OF UNDERGROUND HIGH-PRESSURE GAS STORAGE AND CONSTRUCTION METHOD THEREOF

(71) Applicants: CHINA UNIVERSITY OF MINING AND TECHNOLOGY, Xuzhou (CN); YUNLONG LAKE LABORATORY OF DEEP EARTH SCIENCE AND ENGINEERING, Xuzhou (CN); Jinneng Holding Coal Industry Group Shuozhou Coal and Electricity Co., Ltd., Shuozhou (CN)

(72) Inventors: Bo Meng, Xuzhou (CN); Xiaozhao Li, Xuzhou (CN); Bangguo Jia, Xuzhou (CN); Hongwen Jing, Xuzhou (CN); Zhanguo Ma, Xuzhou (CN); Qian Yin, Xuzhou (CN); Yanjun Qi, Xuzhou (CN); Dajiang Liu, Xuzhou (CN); Fangtao Hu, Xuzhou (CN); Jiangyu Wu, Shuozhou (CN); Zengjie Tian, Xuzhou (CN); Jiyu Wang, Xuzhou (CN)

(73) Assignees: CHINA UNIVERSITY OF MINING AND TECHNOLOGY, Xuzhou (CN); YUNLONG LAKE LABORATORY OF DEEP EARTH SCIENCE AND ENGINEERING, Xuzhou (CN); Jinneng Holding Coal Industry Group Shuozhou Coal and Electricity Co., Ltd., Shuozhou (CN)

( * ) Notice: Subject to any disclaimer, the term of this patent is extended or adjusted under 35 U.S.C. 154(b) by 0 days.

(21) Appl. No.: 19/007,749

(22) Filed: Jan. 2, 2025

(30) Foreign Application Priority Data

Apr. 12, 2024 (CN) ........................ 202410438454.0

(51) Int. Cl.
*F17C 1/00* (2006.01)

(52) U.S. Cl.
CPC ...... *F17C 1/007* (2013.01); *F17C 2203/0604* (2013.01); *F17C 2203/0639* (2013.01);
(Continued)

(58) Field of Classification Search
CPC .............. F17C 1/007; F17C 2203/0604; F17C 2203/0639; F17C 2203/0678;
(Continued)

(56) References Cited

U.S. PATENT DOCUMENTS 3,818,710 A * 6/1974 Chlumecky ........... E21D 11/385 405/152
2023/0313681 A1 10/2023 Yan et al.

FOREIGN PATENT DOCUMENTS

CN 208669320 U 3/2019
CN 210564554 U 5/2020
(Continued)

OTHER PUBLICATIONS

English Machine Translation of CN-217712585-U (Year: 2022).*
(Continued)

*Primary Examiner* — Don M Anderson
*Assistant Examiner* — Laura E. Parker
(74) *Attorney, Agent, or Firm* — Pilloff Passino & Cosenza LLP; Rachel K. Pilloff; Sean A. Passino

(57) ABSTRACT

A sealing structure of an underground high-pressure gas storage and a construction method thereof are provided. The sealing structure includes an annular lining structure, wherein the annular lining structure is surrounded by a plurality of concrete segments; closed steel sheets; the closed steel sheets are arranged at an inner side of the annular lining structure and used for connecting two adjacent concrete segments and plugging a gap between two
(Continued)

adjacent concrete segments; and a sealing layer, wherein the sealing layer is arranged close to the inner side of the annular lining structure and forms a coating with the annular lining structure on the closed steel sheets.

6 Claims, 9 Drawing Sheets

(52) U.S. Cl.
CPC ................. *F17C 2203/0678* (2013.01); *F17C 2270/0142* (2013.01)

(58) Field of Classification Search
CPC ...... F17C 2270/0142; F17C 2203/0609; F17C 2203/0619; F17C 2203/0621; F17C 2203/0624; F17C 2203/0629; F17C 2203/0631; E21D 11/00; E21D 11/08; E21D 11/083; B65D 88/76; B65D 90/08; B65D 90/024; B65D 88/52; B65D 88/526; B65D 88/528; B65D 90/023; B65D 90/04; B65D 90/046; F16L 9/08
USPC .................................... 220/567.1, 4.12, 4.16
See application file for complete search history.

(56) References Cited

FOREIGN PATENT DOCUMENTS

| | | | | |
|---|---|---|---|---|
| CN | 212254422 | U | | 12/2020 |
| CN | 217712585 | U | * | 11/2022 |
| CN | 116220744 | A | * | 6/2023 |
| CN | 117759336 | A | | 3/2024 |
| JP | 2016020597 | A | | 2/2016 |

OTHER PUBLICATIONS

English Machine Translation of CN-116220744-A (Year: 2023).*
Retrieval report-First search dated Aug. 19, 2024 in SIPO application No. 202410438454.0.
Retrieval report-Supplementary search dated Sep. 3, 2024 in SIPO application No. 202410438454.0.
Notification to Grant Patent Right for Invention dated Sep. 9, 2024 in SIPO application No. 02410438454.0.
Notice of first Office action dated Aug. 20, 2024 in SIPO application No. 202410438454.0.

* cited by examiner

SEALING STRUCTURE OF UNDERGROUND HIGH-PRESSURE GAS STORAGE AND CONSTRUCTION METHOD THEREOF

CROSS-REFERENCE TO RELATED APPLICATIONS

This application claims priority to Chinese Patent Application No. 202410438454.0, filed on Apr. 12, 2024, the contents of which are hereby incorporated by reference.

TECHNICAL FIELD

The disclosure belongs to the technical field of underground gas storage, and particularly relates to a sealing structure of an underground high-pressure gas storage and a construction method thereof.

BACKGROUND

Underground gas storage is an important gas storage facility formed by injecting high-pressure gas into underground cavity, which plays a key role in ensuring energy security. The construction of underground gas storage is faced with complex geological structure and high operating pressure, which requires the sealing structure of gas storage to have certain ductility under high gas pressure.

In the prior art, the China disclosure patent application with the publication number of CN117759336A proposes an underground gas storage and a layout method. The gas storage includes underground cavity, a lining layer arranged on the inner wall of underground cavity, and a sealing layer arranged on the inner side of the lining layer. The lining layer is surrounded by a plurality of concrete lining blocks, and two adjacent concrete lining blocks are movably connected through a connecting assembly. The above structure aims to solve the technical problem of poor tensile performance of concrete lining layer in the prior art. However, the technical scheme still has the problem of poor ductility, especially under the condition of high-pressure gas pressure, its ductility may not reach the expected effect.

In view of this, it is necessary to propose a sealing structure of underground high-pressure gas storage and a construction method thereof to solve the above problems.

SUMMARY

The present disclosure aims to solve the above technical problems to some extent. Therefore, the disclosure provides a sealing structure of an underground high-pressure gas storage and a construction method thereof, so as to solve the problem of insufficient ductility of the sealing structure of the gas storage under high-pressure gas pressure.

In order to achieve the above object, in one aspect, the present disclosure provides a sealing structure of an underground high-pressure gas storage, including:

- an annular lining structure, where the annular lining structure is surrounded by a plurality of concrete segments;
- closed steel sheets; the closed steel sheets are arranged at an inner side of the annular lining structure and used for connecting two adjacent concrete segments and plugging a gap between two adjacent concrete segments;
- a sealing layer, where the sealing layer is arranged close to the inner side of the annular lining structure and forms a coating with the annular lining structure on the closed steel sheets.

Based on the above structure, the gas storage is capable of being deformed greatly, the gas storage pressure may be further improved, and may adapt to the geological conditions of soft rocks.

Optionally, the concrete segments are 1/N of the annular lining structure.

Optionally, empty slots are respectively arranged near both ends of each of the inner side of the concrete segments; each of the empty slots is provided with an outlet towards an inner wall of each of the concrete segments; two ends of each of the closed steel sheets respectively enter the empty slots of two adjacent concrete segments to form a connection.

Optionally, two ends of each of the closed steel sheet are provided with T-shaped structures adapted to the empty slots.

Optionally, pressure sensors in contact with the T-shaped structures are arranged in each of the empty slot. When the maximum gas storage pressure is reached, the closed steel sheets are pulled, and the T-shaped structures at both ends contact the pressure sensors, and the pressure sensor will obtain an alarm.

Optionally, a part of each of the closed steel sheets not entering each of the empty slots is arc-shaped, and a radian is consistent with a radian of an inner wall of the annular lining structure.

Optionally, a width of the outlet is consistent with a thickness of each of the closed steel sheets.

Optionally, the sealing layer is an integral annular body made of rubber.

Optionally, a deformation of the sealing layer and the concrete segments is consistent.

On the other hand, the disclosure provides a construction method of a sealing structure of an underground high-pressure gas storage, which is used for installing the sealing structure of the underground high-pressure gas storage, and the method includes the following steps:

- S1, determining a position of the gas storage, carrying out rock mechanics experiments, obtaining material parameters and carrying out numerical simulation;
- S2, determining a maximum gas storage pressure of the gas storage through the numerical simulation, and calculating a circumferential displacement of the gas storage;
- S3, determining a length of each of the closed steel sheets and changing a number of cord layers to adjust a rigidity of the sealing layer according to the circumferential displacement of the gas storage, so that the deformation of the concrete segments and the sealing layer is consistent; and
- S4, installing and constructing.

The disclosure discloses the following beneficial effect.

The sealing structure of underground high-pressure gas storage has good ductility, and based on this characteristic, the gas storage may be deformed greatly, and the gas storage pressure may be further improved, thus adapting to the geological conditions of soft rock layers.

BRIEF DESCRIPTION OF THE DRAWINGS

In order to explain the embodiments of the present disclosure or the technical scheme in the prior art more clearly, the drawings needed in the embodiments will be briefly introduced below. Obviously, the drawings described below are only some embodiments of the present disclosure, and other drawings may be obtained according to these drawings without creative work for ordinary people in the field.

DETAILED DESCRIPTION OF THE EMBODIMENTS

In the following, the technical scheme in the embodiment of the disclosure will be clearly and completely described with reference to the attached drawings. Obviously, the described embodiments are only a part of the embodiments of the disclosure, but not the whole embodiments. Based on the embodiments in the present disclosure, all other embodiments obtained by ordinary technicians in the field without creative labor belong to the scope of protection of the present disclosure.

In order to make the above objects, features and advantages of the present disclosure more obvious and easy to understand, the present disclosure will be further described in detail with the attached drawings and specific embodiments.

Figure 6:
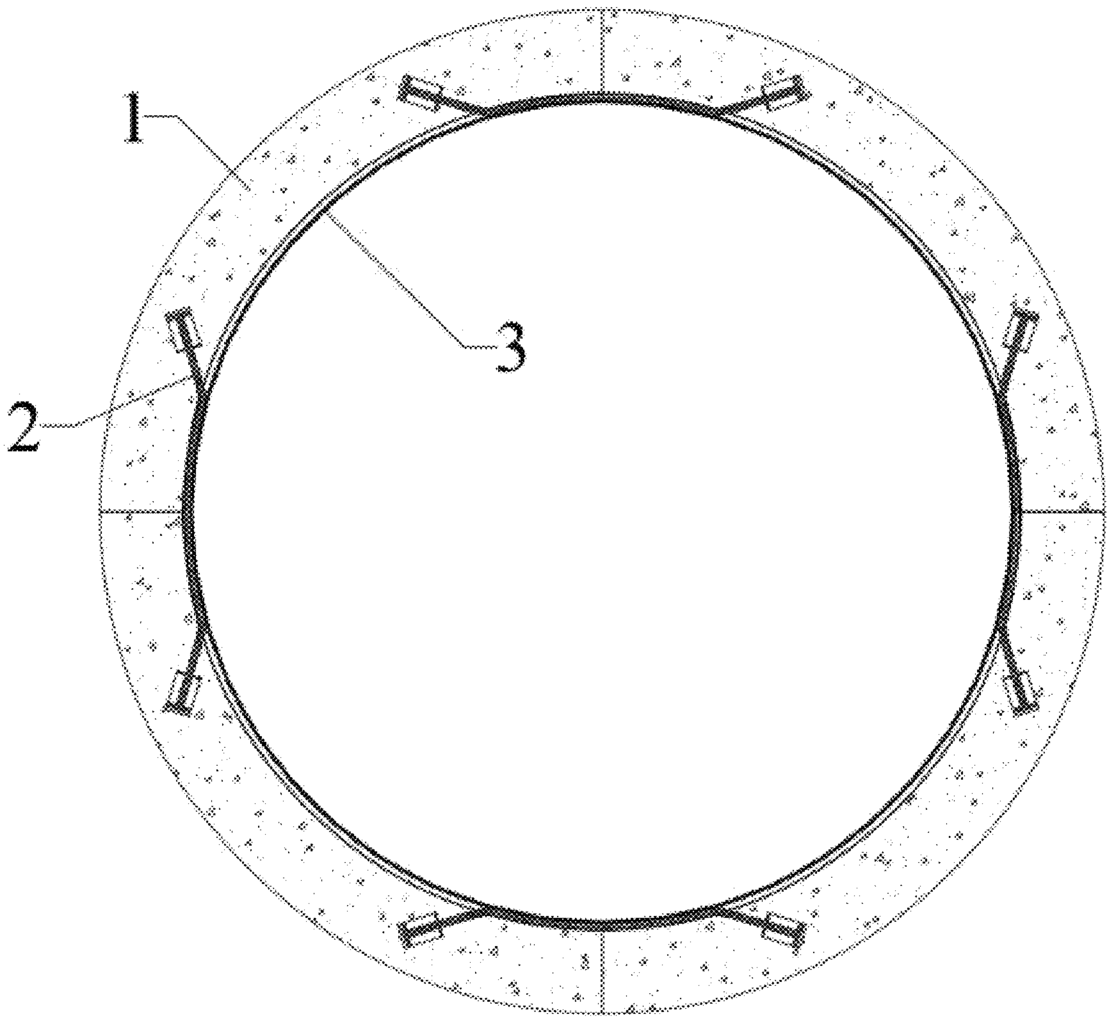
FIG. 6 is a schematic diagram of the combination of concrete segments, closed steel sheets and the sealing layer in the present disclosure.

Referring to FIG. 1-FIG. 8, the disclosure provides a sealing structure of an underground high-pressure gas storage, which is arranged at the inner side of the underground gas storage. The sealing structure includes concrete segments 1, closed steel sheets 2 and a sealing layer 3, and a plurality of concrete segments 1 are enclosed into a complete annular lining structure, and a plurality of concrete segments 1 are connected by the closed steel sheets 2, that is, one closed steel sheet 2 is drawn between every two adjacent concrete segments, and the sealing layer 3 is annular, and is arranged at the inner side of the annular lining structure, and the specific structure is shown in FIG. 6.

Figure 1:
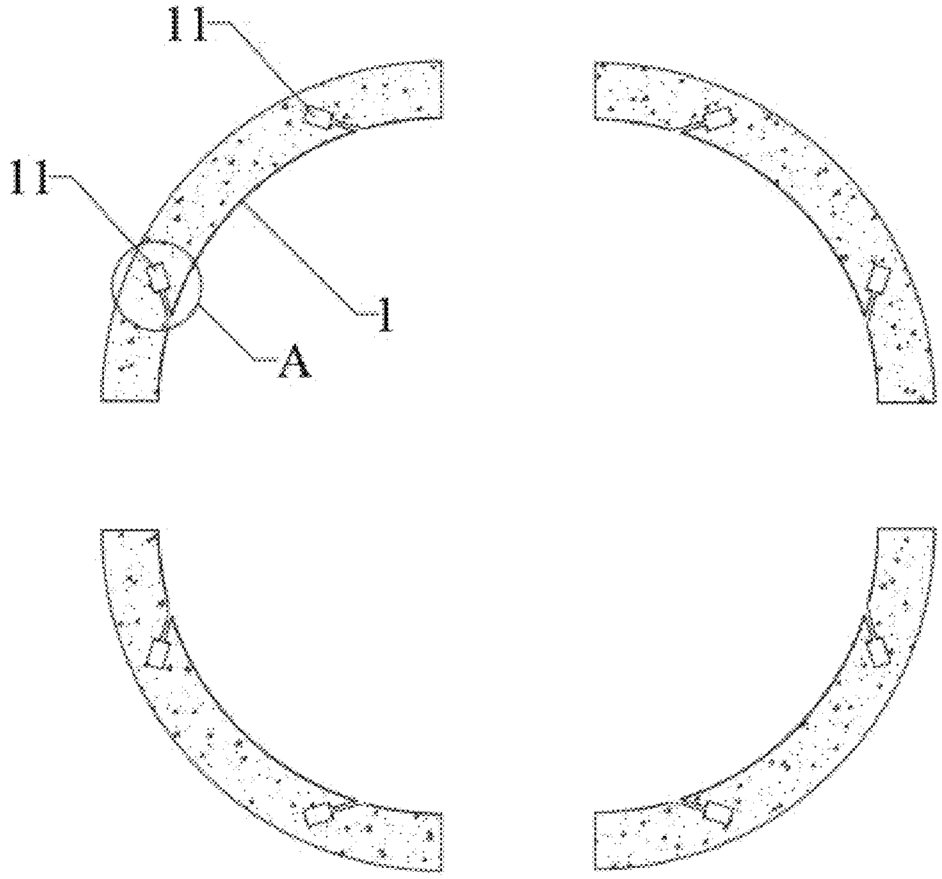
FIG. 1 is a schematic structural diagram of concrete segments in a sealing structure of an underground high-pressure gas storage.

In the further optimization scheme, as shown in FIG. 1, the concrete segments 1 are 1/N of the annular lining structure. In this embodiment, taking FIG. 1 as an example, the concrete segment 1 is ¼ circle, and four concrete segments 1 are connected end to end to form the annular lining structure. Empty slots 11 are respectively arranged near both ends of each of the inner side of the concrete segments 1; each of the empty slots 11 is provided with an outlet towards an inner wall of each of the concrete segments 1. The outlet position is reinforced to prevent the closed steel sheets 2 from being damaged when entering the two ends of the empty slot 11, and the width of the outlet is consistent with the thickness of the closed steel sheet 2.

Figure 3:
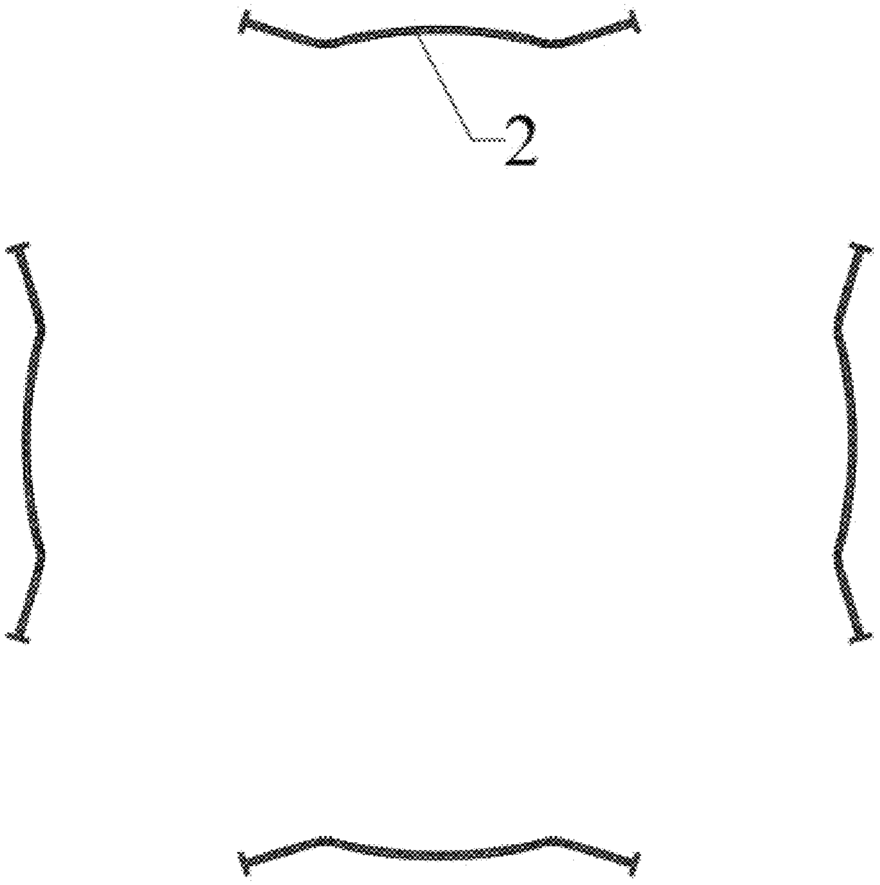
FIG. 3 is a structural schematic diagram of the closed steel sheets in the sealing structure of the underground high-pressure gas storage of the present disclosure.

In a further optimization scheme, as shown in FIG. 3, the whole closed steel sheet 2 is approximately W-shaped, including an arc-shaped section in the middle and cable-stayed sections located at both ends of the arc-shaped section, where the radian of the arc-shaped section is consistent with the radian of the inner wall of the annular lining structure, and the end of the cable-stayed section has a T-shaped structure, which is used to form a force with the empty slot 11 to prevent the closed steel sheets 2 from falling off under tension. When in use, compressed gas is added into the gas storage, so that the concrete segments 1 are stressed, and the contact position between two adjacent concrete segments 1 is pulled and separated, resulting in a gap. On the one hand, the closed steel sheets 2 overcome a part of the pulling force to reduce the generation of the separation gap, on the other hand, the generated gap is blocked, and the sealing layer 3 is prevented from generating stress concentration, cracking and air leakage at the gap.

Figure 4:
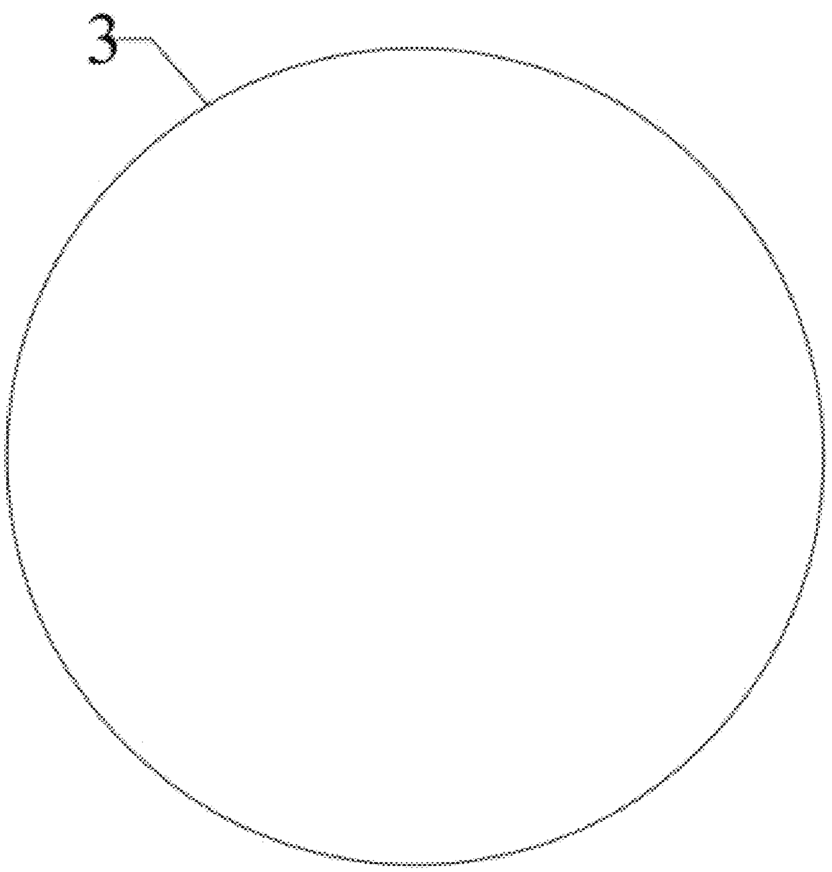
FIG. 4 is a structural schematic diagram of the sealing layer in the sealing structure of the underground high-pressure gas storage of the present disclosure.
Figure 5:
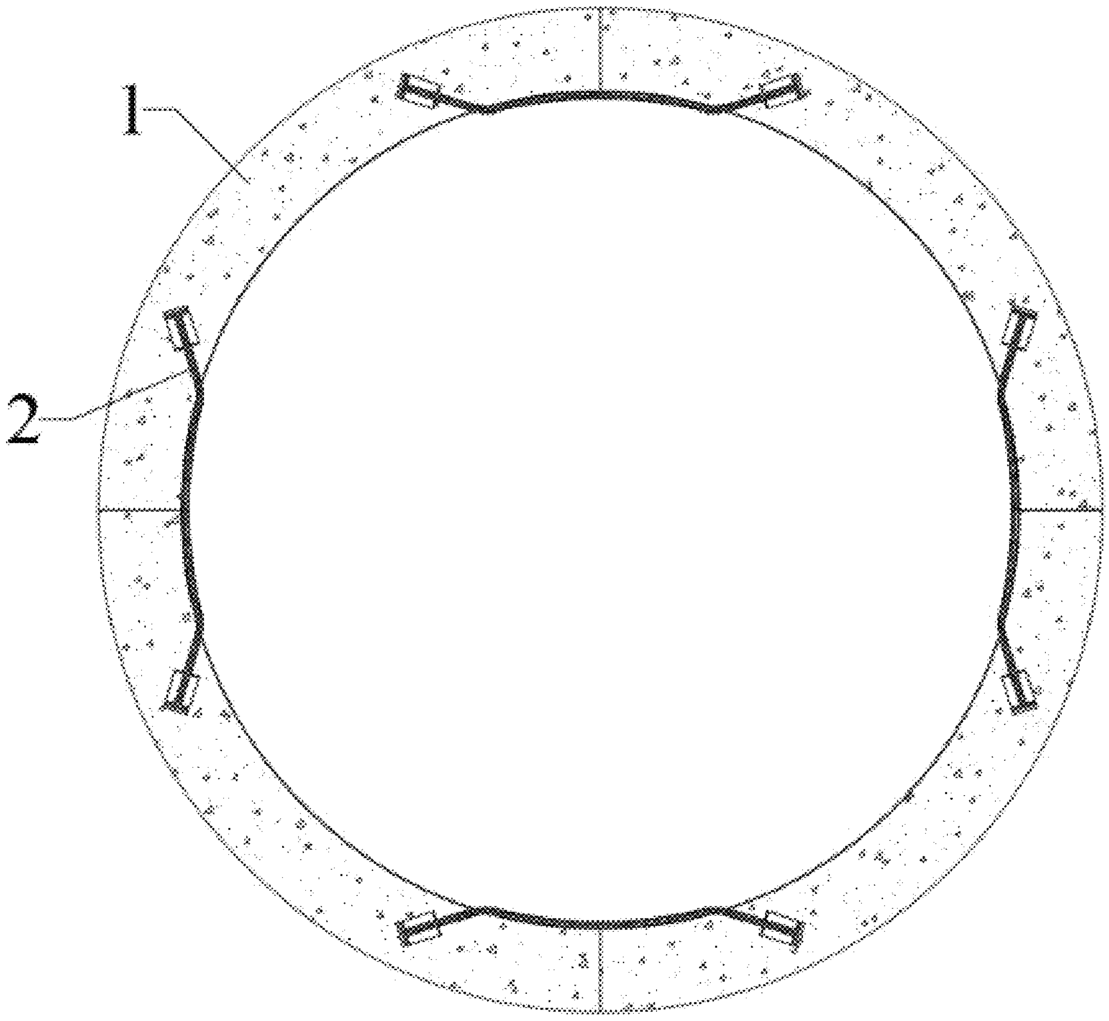
FIG. 5 is a combined schematic diagram of concrete segments and closed steel sheets in the present disclosure.

In a further optimization scheme, as shown in FIG. 4, the sealing layer 3 is an integral annular body made of rubber.

In a further optimization scheme, the deformation of the sealing layer 3 and the concrete segments 1 is coordinated.

In a further optimization scheme, the sealing layer 3 changes the stiffness of the sealing layer 3 through the number of cord layers, so as to adapt to the consistent deformation of the sealing layer 3 and the concrete segments 1 under different working conditions (such as maximum sealing pressure and different geological conditions).

Figure 2:
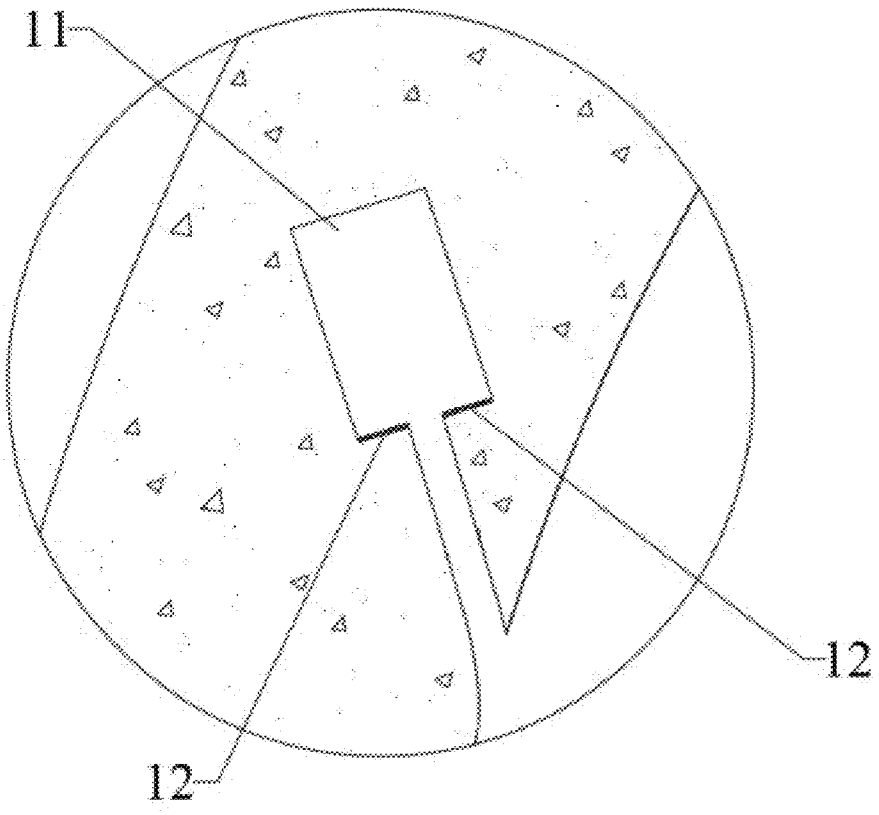
FIG. 2 is a partial enlarged view at A in FIG. 1.

To further optimize the scheme, as shown in FIG. 2, pressure sensors 12 in contact with the T-shaped structures of the closed steel sheets 2 are arranged in the empty slots 11 of the concrete segments 1; when the closed steel sheets 2 are pulled, the pressure between the T-shaped structures at both ends and the pressure sensors 12 increases, and when the pressure value exceeds the set threshold, the pressure sensors 12 give an alarm; at this time, it is suggested that the sealing structure has reached the maximum annular displacement, and it is forbidden to continue to inflate the gas storage to avoid the damage of the sealing structure caused by excessive pressure in the gas storage.

In a further optimization scheme, the concrete segments 1 may be cast-in-place concrete lining blocks or precast concrete lining blocks.

Further optimizing the scheme, the thickness of each part of the concrete segment 1 is consistent; the thickness of the concrete segment 1 is determined according to the comprehensive factors such as the design size of the gas storage and the strength of the surrounding rock of the cavern, and is not specifically limited in this embodiment.

In a further optimization scheme, the closed steel sheets 2 are a solid steel sheet with a certain tensile strength, and the closed steel sheet 2 is integrally formed.

Figure 8:
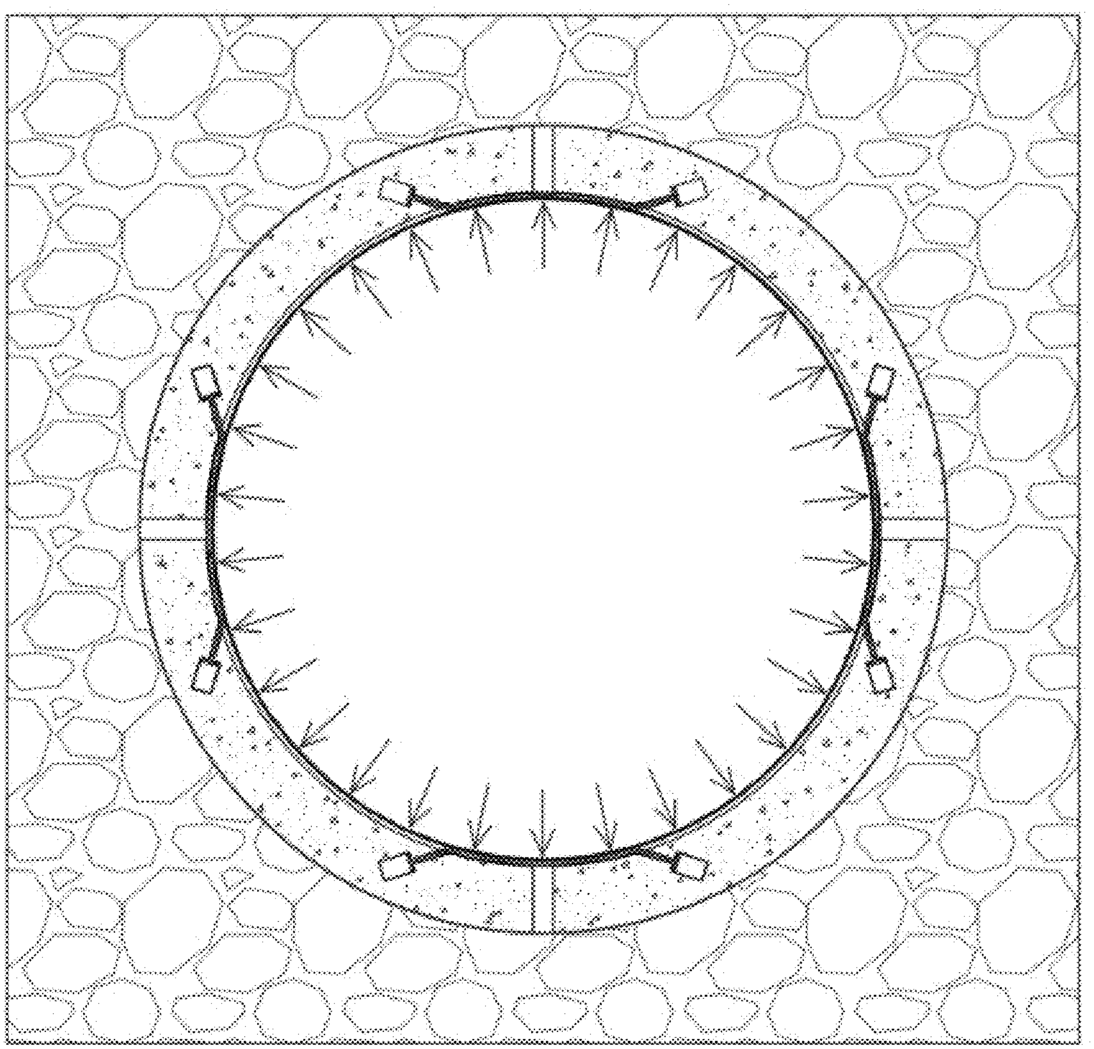
FIG. 8 is a mechanical schematic diagram of the sealing structure of underground high-pressure gas storage under high-pressure gas storage pressure.

The working principle of the sealing structure of the underground high-pressure gas storage in the embodiment of the disclosure is as follows:

when high-pressure gas is injected into the gas storage, the concrete segments 1 are forced to expand outwards under the action of the internal high-pressure gas; as shown in FIG. 8, gaps are generated between concrete segments 1, and closed steel sheets 2 prevent stress concentration of sealing layer 3 at the gaps, leading to cracking of sealing layer 3. Both ends of closed steel sheets 2 are T-shaped structures. When the maximum annular displacement of sealing structure is reached, the T-shaped structure will contact with the inner wall of empty slot 11 of concrete segment 1, and the pressure sensor 12 will be alarmed. At this time, it is forbidden to inflate the gas storage, so as to increase the internal pressure of the gas storage and prevent the sealing structure from being damaged.

Figure 9:
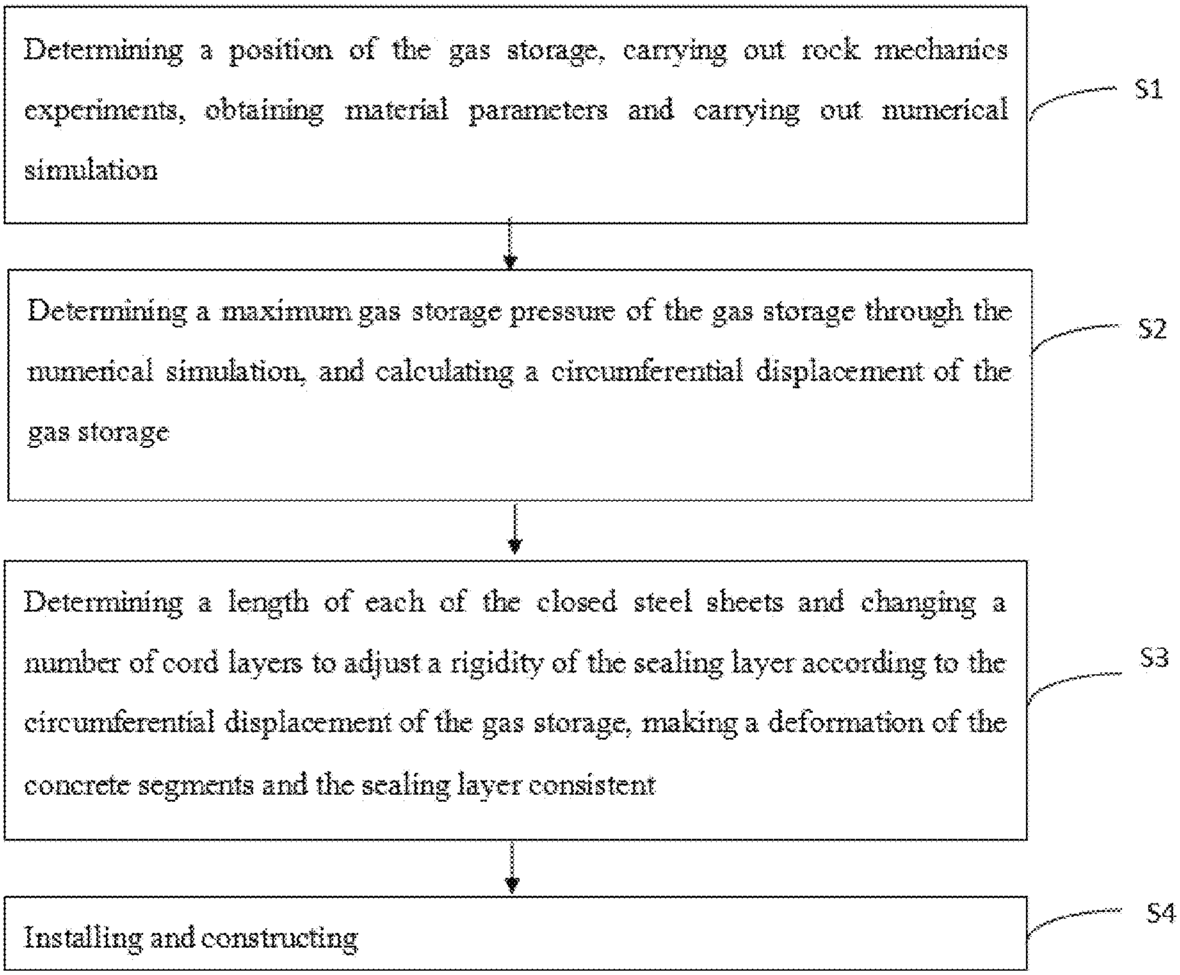
FIG. 9 is a flow chart of a construction method of the sealing structure of the underground high-pressure gas storage.

The disclosure also provides a construction method of the sealing structure of the underground high-pressure gas storage, as shown in FIG. 9, which is used for installing the sealing structure of the underground high-pressure gas storage, and the method includes the following steps:

S1, determining the position of the gas storage, carrying out rock mechanics experiments, obtaining material parameters and carrying out numerical simulation;

S2, determining the maximum gas storage pressure of the gas storage through numerical simulation calculation, and calculating the circumferential displacement of the gas storage;

S3, according to the circumferential displacement of the gas storage, determining the length of the closed steel sheet 2 and changing the number of cord layers to adjust the rigidity of the sealing layer 3, so that the deformation of the concrete segment 1 and the sealing layer 3 is consistent;

S4, excavating the underground cavity, splicing and installing the concrete segments 1, connecting the closed steel sheets 2 and the sealing layer 3 to obtain a gas storage with a sealed structure; and S5, inflating the gas storage, and the concrete segments 1 begin to be pulled and separated from each other until the T-shaped structures at both ends of the closed steel sheet 2 contact with the pressure sensor 12, and the pressure sensor 12 will obtain an alarm and stop inflating.

Figure 7:
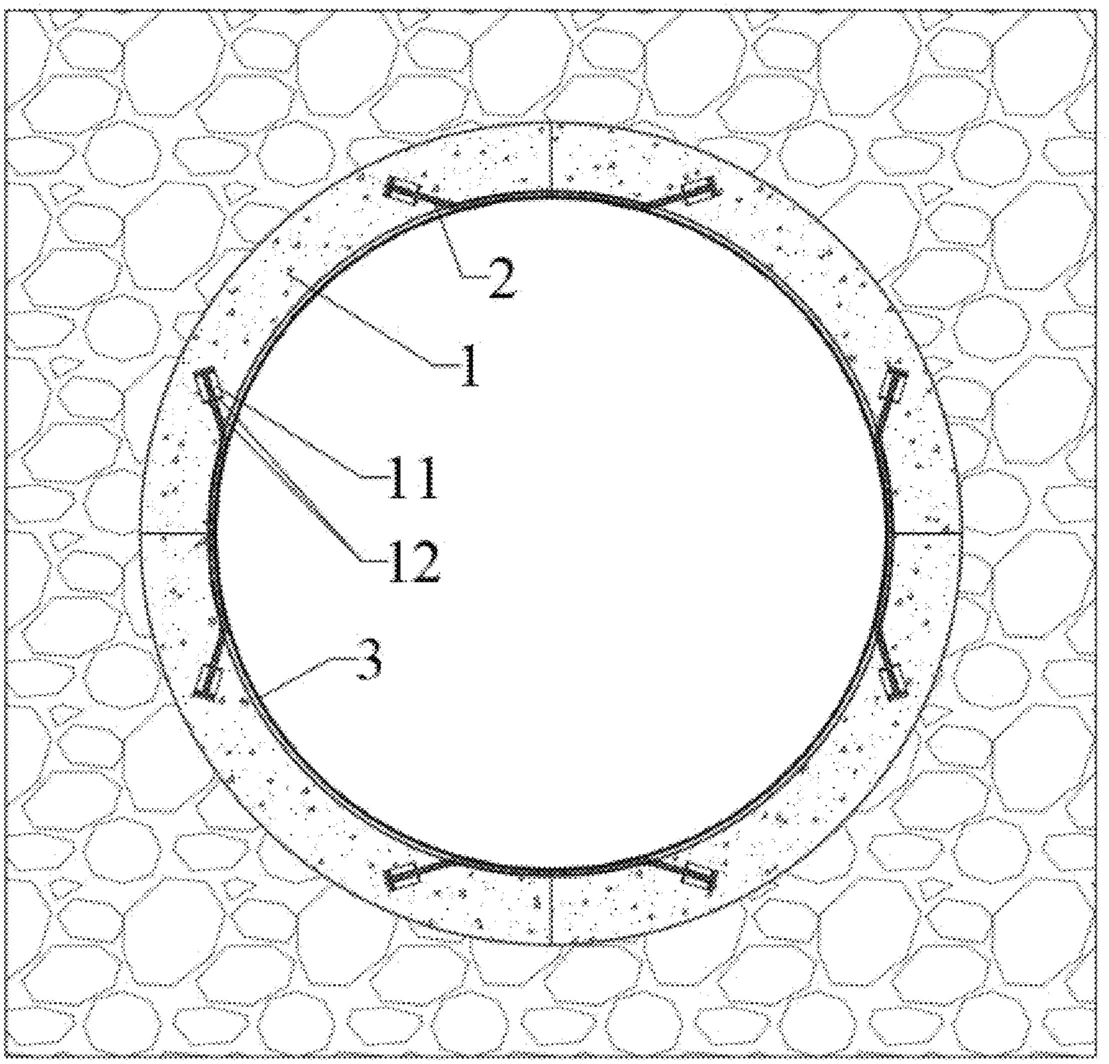
FIG. 7 is a schematic diagram of the installation of the sealing structure of the underground high-pressure gas storage in underground cavity.

FIG. 7 is the effect diagram of the sealing structure of the underground high-pressure gas storage of the present disclosure after construction, and FIG. 8 is the stress diagram of the sealing structure of the underground high-pressure gas storage of the present disclosure.

The details of the present disclosure are conventional technical means known to those skilled in the art.

In the description of the present disclosure, it should be understood that the orientation or positional relationships indicated by the terms "longitudinal", "transverse", "upper", "lower", "front", "rear", "left", "right", "vertical", "horizontal", "top", "bottom", "inner", "outer" are based on the orientation or positional relationship shown in the drawings are only for the convenience of describing the disclosure, rather than indicating or implying that the device or element referred to must have a specific orientation, be constructed and operated in a specific orientation, and therefore cannot be understood as a limitation to the disclosure.

The above-mentioned embodiments only describe the preferred mode of the disclosure, and do not limit the scope of the disclosure. Under the premise of not departing from the design spirit of the disclosure, various modifications and improvements made by ordinary technicians in the field to the technical scheme of the disclosure shall fall within the protection scope determined by the claims of the disclosure.

What is claimed is:

1. A sealing structure of an underground high-pressure gas storage, arranged inside a gas storage, comprising:

an annular lining structure, wherein the annular lining structure is formed by enclosing a plurality of concrete segments;

closed steel sheets, wherein the closed steel sheets are arranged at an inner side of the annular lining structure and used for connecting two adjacent concrete segments and plugging a gap between the two adjacent concrete segments; and a sealing layer, wherein the sealing layer is arranged close to the inner side of the annular lining structure and forms a coating with the annular lining structure on the closed steel sheets;

wherein each of the concrete segments has an equal arc length and the plurality of the concrete segments together form a circle; empty slots are respectively arranged near both ends of an inner side of each of the concrete segments; each of the empty slots is provided with an outlet towards an inner wall of each of the concrete segments; two ends of each of the closed steel sheets respectively enter the empty slots of the two adjacent concrete segments to form a connection;

two ends of each of the closed steel sheets are provided with T-shaped structures adapted to the empty slots; and pressure sensors in contact with the T-shaped structures are arranged in each of the empty slots.

2. The sealing structure of the underground high-pressure gas storage according to claim 1, wherein a part of each of the closed steel sheets not entering each of the empty slots is arc-shaped, and the arc-shaped part of each of the closed steel sheets is consistent with an inner wall of the annular lining structure in curvature.

3. The sealing structure of the underground high-pressure gas storage according to claim 1, wherein a width of the outlet is consistent with a thickness of each of the closed steel sheets.

4. The sealing structure of the underground high-pressure gas storage according to claim 1, wherein the sealing layer is an integral annular body made of rubber.

5. The sealing structure of the underground high-pressure gas storage according to claim 4, wherein a deformation of the sealing layer and the concrete segments is consistent.

6. A construction method of an underground high-pressure gas storage having the sealing structure according to claim 1, comprising the following steps:

step S1, determining a position of the gas storage, carrying out rock mechanics experiments, obtaining material parameters and carrying out numerical simulation;

step S2, determining a maximum gas storage pressure of the gas storage through the numerical simulation, and calculating a circumferential displacement of the gas storage;

step S3, determining a length of each of the closed steel sheets and changing a number of cord layers to adjust a rigidity of the sealing layer according to the circumferential displacement of the gas storage, making a deformation of the concrete segments and the sealing layer consistent; and step S4, installing and constructing the sealing structure.

* * * * *